United States Patent [19]

Andersson et al.

[11] Patent Number: 5,684,465
[45] Date of Patent: Nov. 4, 1997

[54] METHOD AND MEANS FOR SUPERVISION OF VALVE UNITS

[75] Inventors: Fräs Robert Andersson, Ludvika; Roland Siljeström, Grängesberg, both of Sweden

[73] Assignee: Asea Brown Boveri AB, Västerås, Sweden

[21] Appl. No.: 621,359

[22] Filed: Mar. 25, 1996

[30] Foreign Application Priority Data

Mar. 30, 1995 [SE] Sweden ................................ 9501161

[51] Int. Cl.$^6$ ................................................ G08B 21/00
[52] U.S. Cl. ........................ 340/660; 340/659; 340/661; 340/662; 363/54; 363/57
[58] Field of Search ................................ 340/635, 638, 340/639, 660, 661, 662, 659; 363/54, 57, 96, 85, 128, 135

[56] References Cited

U.S. PATENT DOCUMENTS

| 4,325,114 | 4/1982 | Kobayashi et al. ................ 363/68 |
| 4,377,835 | 3/1983 | Asplund et al. ..................... 361/91 |
| 4,633,380 | 12/1986 | Kashiwazaki ....................... 363/54 |

FOREIGN PATENT DOCUMENTS

| 0073059 A1 | 3/1983 | European Pat. Off. . |
| 0103182 A1 | 3/1984 | European Pat. Off. . |
| 0575131 A1 | 12/1993 | European Pat. Off. . |
| 0639885 A2 | 2/1995 | European Pat. Off. . |

OTHER PUBLICATIONS

International Search Report—National Application Number 9501161-5.

*Primary Examiner*—Jeffery Hofsass
*Assistant Examiner*—Ashok Mannava
*Attorney, Agent, or Firm*—Fishman, Dionne, Cantor & Colburn

[57] ABSTRACT

The invention relates to a method for supervising the functioning of a plurality of valve units, a system for performing the method, a control unit and a control assembly for cooperation with the control unit. Each valve unit in the system comprises a semiconductor element (THY1–THYN) and a control unit for controlling the semiconductor element. The control unit comprises a trigger order input for receiving a trigger order (FP), an indication output for emitting a first indication signal (TP) and a trigger signal output (100) for emitting a trigger signal to the semiconductor element. The method comprises the steps: detecting a positive forward voltage ($U_T$) across the semiconductor valve, generating a first indication signal (IP) when the forward voltage ($U_T$) exceeds a first threshold value ($U_1$), generating a trigger signal upon detected receival of the triggering order signal (FP), and the step: generating a second indication signal (SSTP) when the forward voltage ($U_T$) exceeds a second threshold value ($U_2$).

19 Claims, 8 Drawing Sheets

METHOD AND MEANS FOR SUPERVISION OF VALVE UNITS

The invention relates to a method for supervising the functioning of semiconductor valve units and to a system for carrying out the method, a control unit and a control assembly for cooperation with said control unit.

In a station for transmission between an alternating current system and a system for high-voltage direct current transmission (HVDC) a number of controllable rectifier units are provided, each of which, with regard to the high voltage, consisting of a large number of series-connected valve units comprising thyristors. Each valve unit receives a portion of the rated voltage and each has a semiconductor which is triggable and each is provided with a control unit (TCU). These control units operating at high voltage receive their control signals from a common control assembly at close to earth potential. Conventional light conductors are used for the signal transmission. Equally conventional is to allow these control units to emit so-called indication pulses by means of light conductors to the common control assembly. These signals are emitted in the form of a light pulse as soon as a voltage arises across the thyristor in its forward direction which exceeds a certain threshold value, e.g. 30 V. In this manner, it is possible to ensure that no trigger pulse is sent to the thyristor before a sufficient forward voltage has been attained in order to ensure quick and effective trigging and low power losses during the trigger cycle. In addition to the means for transforming incoming light pulses to electrical trigger signals, as well as to signal with light signals the attainment of a certain forward voltage level, the individual control units also comprise means for executing a voltage-controlled trigging in the event that the trigging in one of the series-connected semiconductors should fail (individual overvoltage protection) and are relatively complicated devices. Reference is made to Ekström: High Power Electronics HVDC and SVC (Stockholm 1989) for a general description of HVDC technology.

It has also been shown to be desirable to reduce the maintenance time for an HVDC plant. According to known technology, maintenance requires that the plant be taken out of operation whilst one or more operators perform error searches by means of partially manual operations in order to determine whether everything is operating correctly or whether some component is suffering from a fault. If the operators discover that a fault is present in the HVDC plant, it then remains to determine which components in the system are the cause of the faulty functioning.

It is previously known to register the absence of the said indication pulses, something which makes it possible to detect the existence of possibly faulty thyristors with regard to the fact that these are often short-circuited when functioning incorrectly. For this reason, no voltage in the forward direction arises and therefore an indication pulse is never sent from such a stricken valve unit.

The indication pulses serve two different purposes. On the one hand they are used to prevent one of the semiconductors receiving an trigger signal before the voltage thereacross is sufficient, and on the other hand the absence of indication pulses from one of the control circuits is registered centrally, whereby it is possible to keep tabs on which of the semiconductors has broken down. The fact that a small number of the series-connected semiconductors have become permanently short-circuited semiconductors have become permanently short-circuited can be tolerated since the remainder have the ability to accept their portion of the total voltage to thereby permit an exchange only during maintenance work.

In Swedish patent application no. 9202500-6 a method is described for fault detection by selecting a single control unit and subjecting the selected control unit to a trigger signal without sending a trigger signal to other valve units. By means of thereafter detecting the moment in time for the appearance of an indication signal from the selected control unit as well as the moment in time for corresponding indication pulses from the other control units in the same rectifier unit, an incorrect functioning of the selected valve unit can be detected.

The known method does, however, require individual activation of each separate valve unit with an individual trigger order pulse $FP_x$.

An object of the present invention is to provide a method which permits reduced maintenance time of an HVDC plant.

A further object of the present invention is to provide a simplified method for supervising the functioning and fault detection of a plurality of valve units in an HVDC plant.

Another object of the invention is to provide a method for supervising the functioning which can be applied during normal operation of the HVDC plant, as well as a system for performing the method.

In addition, it is desirable to check whether the trigging occurs in the intended manner inresponse to a trigger order signal, and to be able to determine whether the trigging occurs instead because of the fact that the over-voltage protection comes into operation.

A further object is to provide a method which permits supervision of the functioning during operation with very small control angles.

These objects are achieved by a method according to the invention. By means of this method, each control unit generates a signal combination of first and second indication signals which permits an automated fault diagnosis. These objects are also achieved by a system for performing the method according to the invention. These objects are also achieved by an advantageous control unit. This control unit attains the object of initiating voltage-controlled trigging should the normal trigging have failed, as well as indicating component malfunction, for the semiconductor valve as well as for other components. In addition, during voltage-controlled trigging, a second indication signal is emitted in order to inform the central control assembly that such trigging has taken place.

The control assembly for cooperation with the control unit has the advantage of being capable of automatically executing an operational check during normal operation. Further features of the invention are described in the remaining claims.

The invention will be described in greater detail below with reference to the attached drawings.

Figure 1:
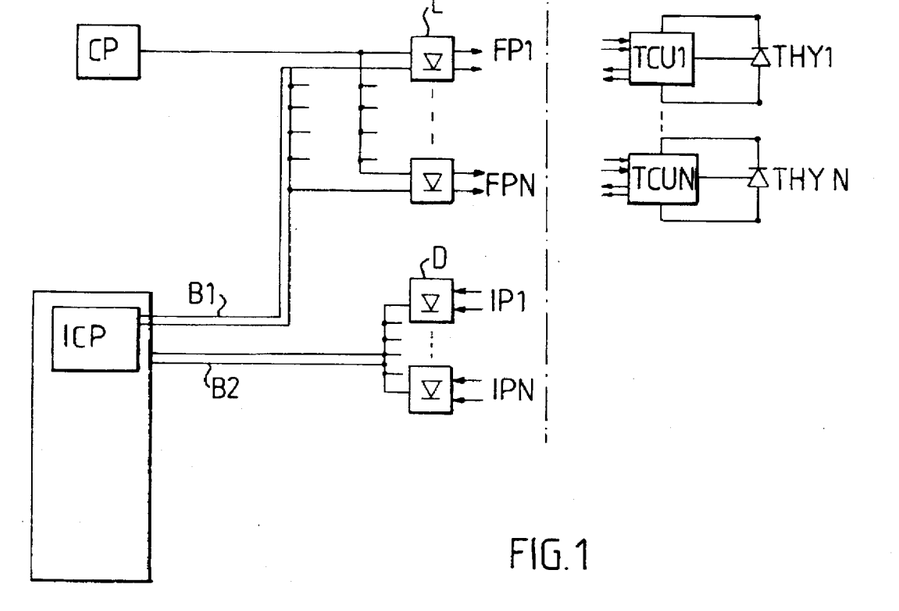
FIG. 1 shows a known type of monitoring system for a rectifier system in an HVDC plant.

A portion of a thyristor valve system with a number of series-connected thyristors THY1–THYN is shown in FIG. 1, though in which only two thyristors have been illustrated. Each thyristor cooperates with its own adjacent control unit TCU1–TCUN at the thyristor's high voltage potential. These units must be at high voltage. In the control equipment at earth potential shown to the left of the dashed line there is a number of light pulse generators $T_1$, which, via light conductors, are connected to respective ones of the control units TCU. All the light pulse generators can be activated simultaneously by a control pulse CP, whereby trigger pulses FP1–FPN are sent to the control units of the thyristors, which provide electrical trigger pulses to cause the thyristors to conduct.

The known art further comprises an individual pulse source ICP, which, via the bus B1, can feed an trigger pulse to just one, totally randomly selectable, of the light sources $T_1$. In this manner, a selected thyristor can be individually trigged.

Indication pulses IP are sent from the control units TCU in the form of light pulses via second light conductors to respective receiving detectors D which generate electrical pulses.

As is known in the art, an indication pulse is generated by a control unit $TCU_X$ to indicate that a sufficient forward voltage has been attained to enable the thyristor to be able to receive a trigger pulse FP. The trigging pulses which arrive at the detectors D are collected in a second bus B2 and studied, for example by means of a microcomputer which generates common control pulses CP or an individual control pulse ICP.

Figure 2:
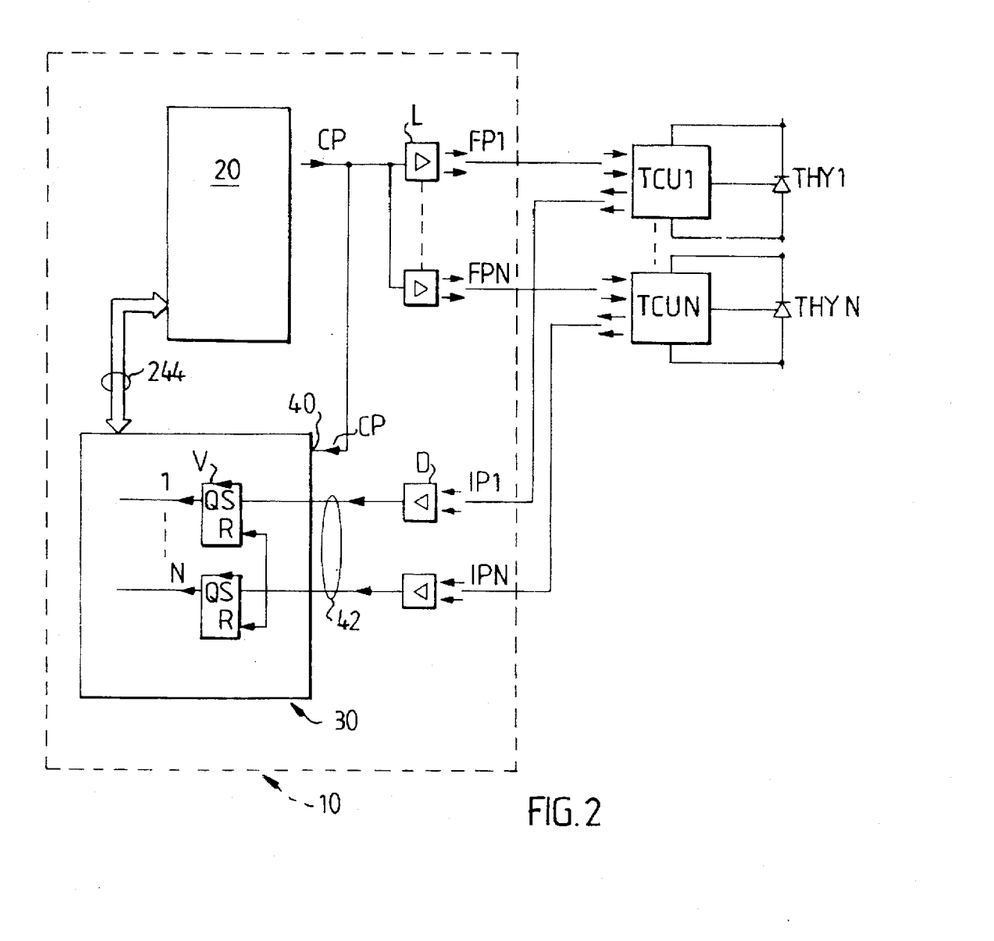
FIG. 2 shows a monitoring system for a rectifier system according to one embodiment of the invention. The monitoring system comprises a plurality of control units and a central control assembly.

FIG. 2 shows a monitoring system according to one embodiment of the invention. Each control unit TCU1–TCUN can communicate with a central control assembly 10 via light conductors in a manner similar to the disclosed known art. Each control unit TCUX comprises means for generating a conventional indication pulse IP as well as means for generating a signal SSTP indicating that voltage-controlled trigging has taken place. Both the signals are transmitted via light conductors to the central control assembly 10.

The central control assembly 10 comprises a control means 20 which, in a known manner, generates a trigger order pulse CP. The central electrical trigging order pulse CP is converted in a known manner by electro-optical means L to optical trigging order signals FP1–FPN to signal to the control units TCU1–TCUN that the thyristors THY1–THYN are to be made to conduct.

The control assembly 10 further comprises an evaluation unit 30 to which the signals TP and SSTP are delivered. The electrical trigging order signal CP generated by the control means is delivered to the evaluation unit 30 on an input 40. The signals IP and SSTP, respectively, originating from the control units TCU are delivered on a signal bus input 42 to the evaluation unit 30.

In terms of hardware and software, the units 20 and 30 which are described in this text can be integrated in a single arrangement, though they are described herein as separate units in order to simplify the understanding of the invention.

Figure 3:
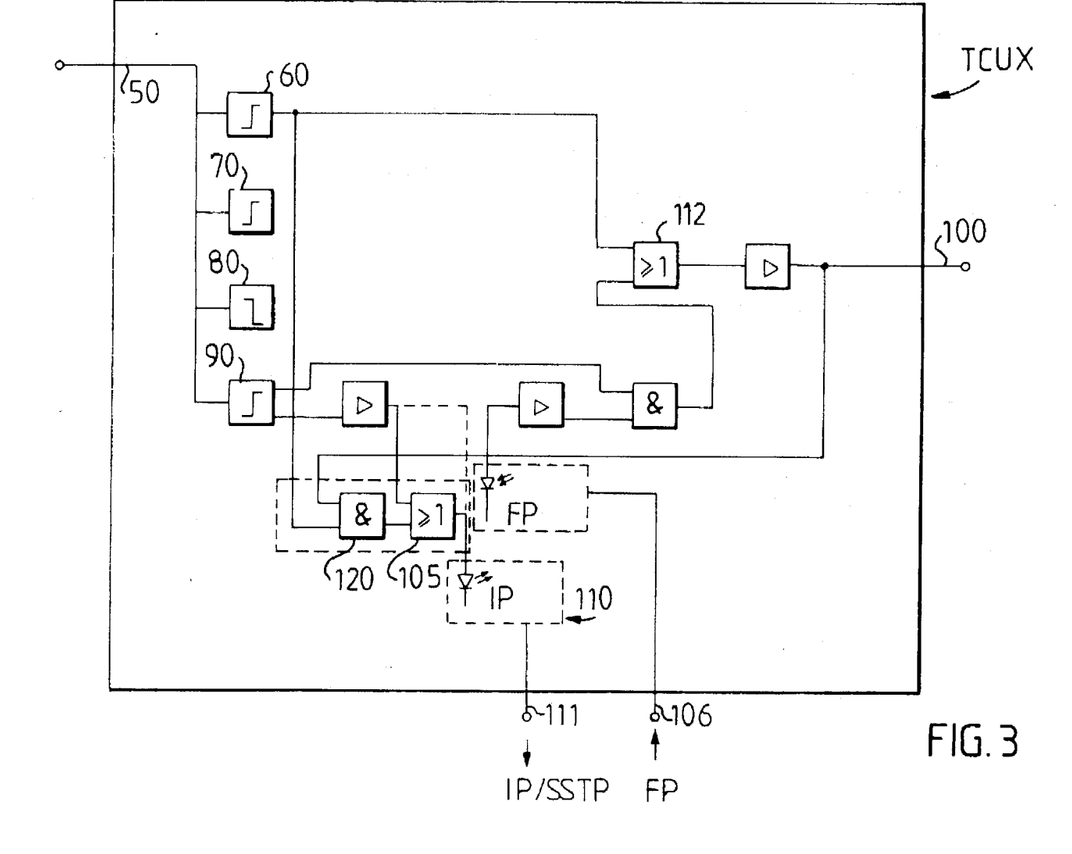
FIG. 3 shows a control unit according to one embodiment of the invention.

FIG. 3 shows a principal block diagram of the relevant components in a control unit TCUX according to one embodiment of the invention. Since these control units are relatively complete arrangements, only the most relevant components for the invention are described here in order to simplify the understanding of the invention and for the sake of clarity.

The control unit TCUX comprises means (not shown) to measure the forward voltage across respective thyristors THYX. A signal which indicates the measured forward voltage is applied to the lead 50 and is distributed to a number of criteria units 60, 70, 80 and 90, respectively.

Each criteria unit involves a stipulation which, together or in combination with another stipulation, must be met in order that an electrical trigging pulse can be fed out on an output 100 for delivery to the gate terminal of the thyristor THYC.

The criteria unit 90 generates an output signal once sufficient forward voltage $U_1$, for example 30 V, is attained to allow trigging of the thyristor. This output signal is delivered to an output of an OR-gate 105, the output of which is connected to an electro-optical means 110 which can generate an optical indication pulse IP on an optical link output 111. In this manner, the indication pulse TPX is generated when the stipulation in the criteria unit 90 is met. The control unit has an input 106 for receiving a trigger order pulse FP from the central control assembly 10.

If for some reason the thyristor is not trigged when remaining thyristors have trigged, the forward voltage will attain a second threshold value $U_2$ at which voltage-controlled trigging of the thyristor will be initiated. The criteria unit 60 is arranged to generate a high output signal "1" when the second threshold value is attained. The second threshold value can, for example, be a forward voltage of 7 kV.

As is illustrated in FIG. 3, the output of the criteria unit 60 is connected to an OR-gate 112 which, in turn, when a high input signal is received, causes a trigger signal to be delivered to the output 110.

The control unit according to the invention further comprises an AND-gate 120 with an input connected to the output of the criteria unit 60, and a second input connected to the output 100 for the trigger signal to the thyristor.

The AND-gate 120 thus generates a high signal on its output when the output signal of the criteria unit 60 is high and a trigger signal is simultaneously delivered to the output 100. The high signal on the output of the AND-gate indicates that voltage-controlled trigging occurs. According to a preferred embodiment of the invention, the output signal of the AND-gate 112 is delivered to a second input of the OR-gate 105. In this manner, a light pulse SSTP is generated which indicates that voltage-controlled trigging SST has occurred, the light pulse being generated by the electro-optical means 110.

According to the preferred embodiment, the signal pulse for SST is coded in the same manner as for the conventional indication pulse IP.

Identification of whether the signal IP/SSTP on the output from the means 110 signals an indication pulse or that voltage-controlled trigging has been attained is performed by the evaluation unit 30 in the central control assembly 10.

Figure 4:
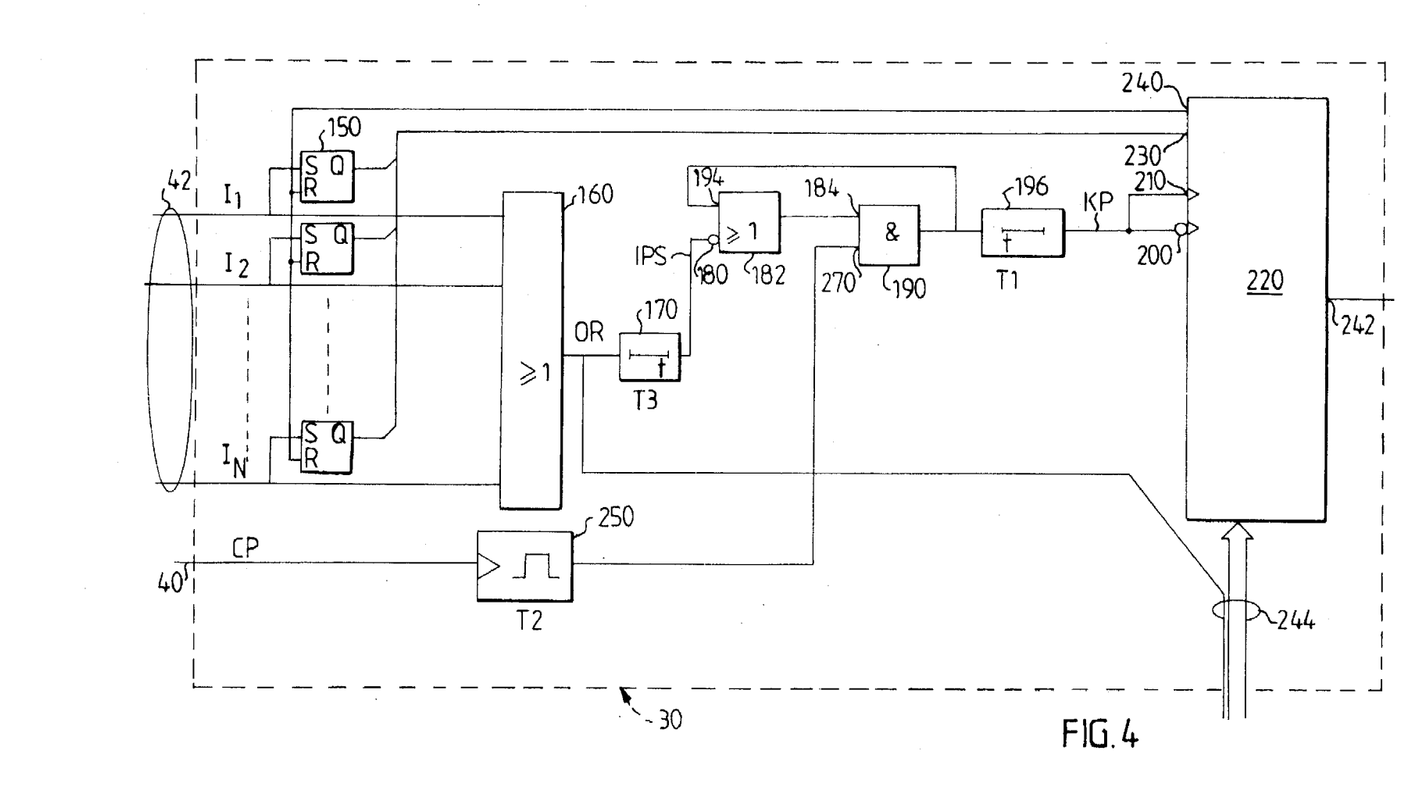
FIG. 4 shows a central control assembly according to one embodiment of the invention.

FIG. 4 shows a principal block diagram of the evaluation unit 30 according to one embodiment of the invention. As has been described above, the evaluation unit receives not only a signal on the input 40 which indicates when a common trigging order signal CP is sent to the control units TCU, but also individual signals $I_1-I_N$ on the multipole input 42 from each control unit TCU.

The evaluation unit 30 comprises an RS flip-flop 150 for each control unit TCU1–TCUN. Each IP/SET signal input is connected both to the set input of an RS flip-flop as well as to an input on an OR-gate 160. The OR-gate 160 thus has an input connected to each of the individual signal inputs on the bus input 42.

The OR-gate 160 has an output which is connected to a time circuit 170, the output of which is connected to an inverting input 180 of an OR-gate 182. The OR-gate 182 has an output which is connected to an input 184 of an AND-gate 190. The output of the AND-gate 190 is connected to a second input 194 of the OR-gate 182. The output of the AND-gate 190 is further connected to an input of a time circuit 196, the output of which is connected to both an inverting input 200 as well as to a non-inverting input 210 of a processor unit 220.

This described processor unit 220 can, in reality, comprise a variety of processors with memory units and signal processing means. In order to simplify the understanding of the invention, it will, however, be described as one processor unit 220.

The processor unit 220 furthermore has a bus input 230 for individual reading of the RS flip-flops 150 and a reset output 240 which is connected to the reset input of all RS flip-flops.

The processor unit 220 additionally has an alarm output 242 and a bus connector 244 via which the processor can communicate with the control means 20. The signal input 40 of the evaluation unit 30 is connected to the input of a monostable flip-flop 250. The output of the monostable flip-flop 250 is connected to a non-inverting input 270 of the AND-gate 190.

Figure 5A:
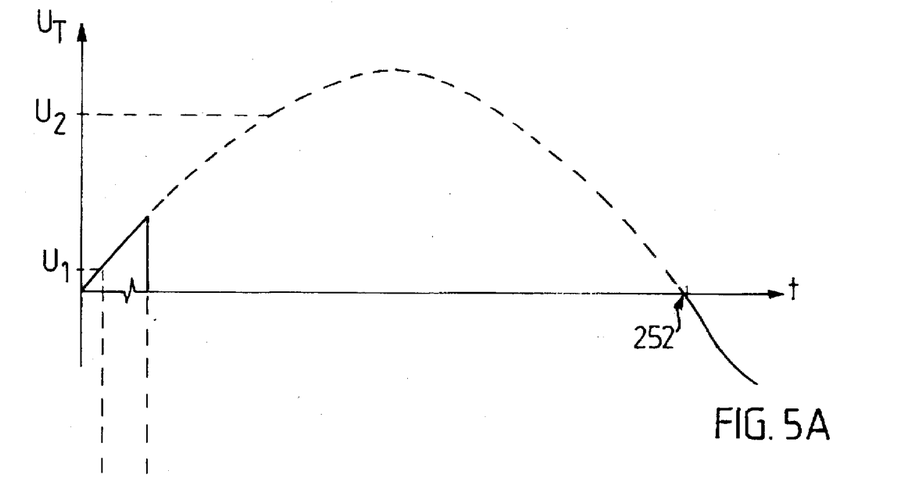
FIGS. 5A–5F show one example of signals and time sequences for these in a system according to FIG. 2 during normal operation.
Figures 5B, 5C:
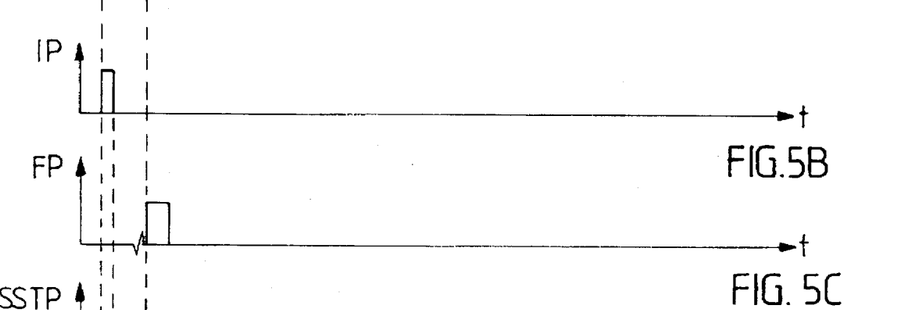
Figures 5D, 5E, 5F:
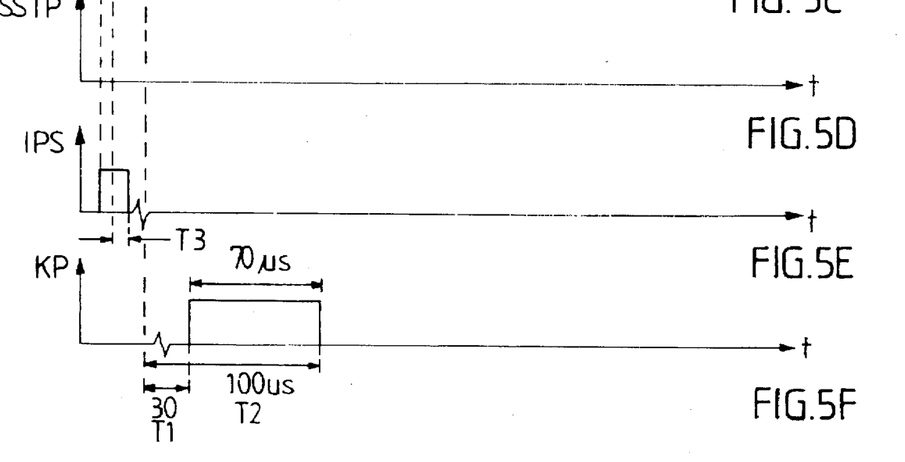
Figure 6A:
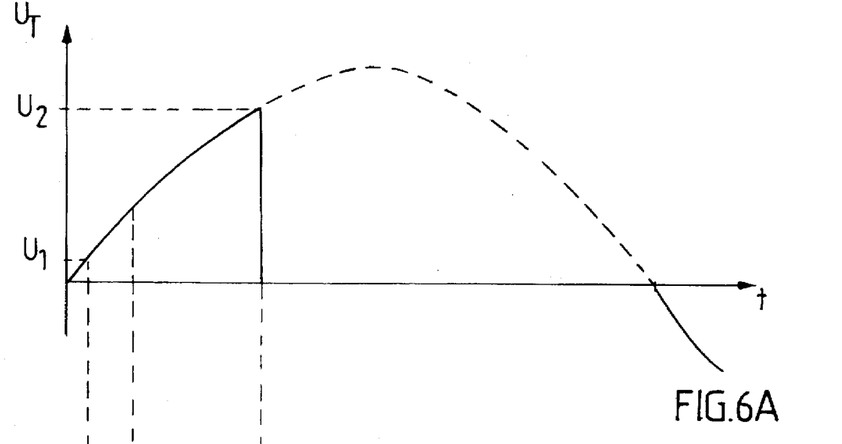
FIGS. 6A–6F show one example of signals and a time sequence in the system according to FIG. 2 when a control unit reports voltage-controlled trigging.
Figures 6B, 6C, 6D, 6E, 6F:
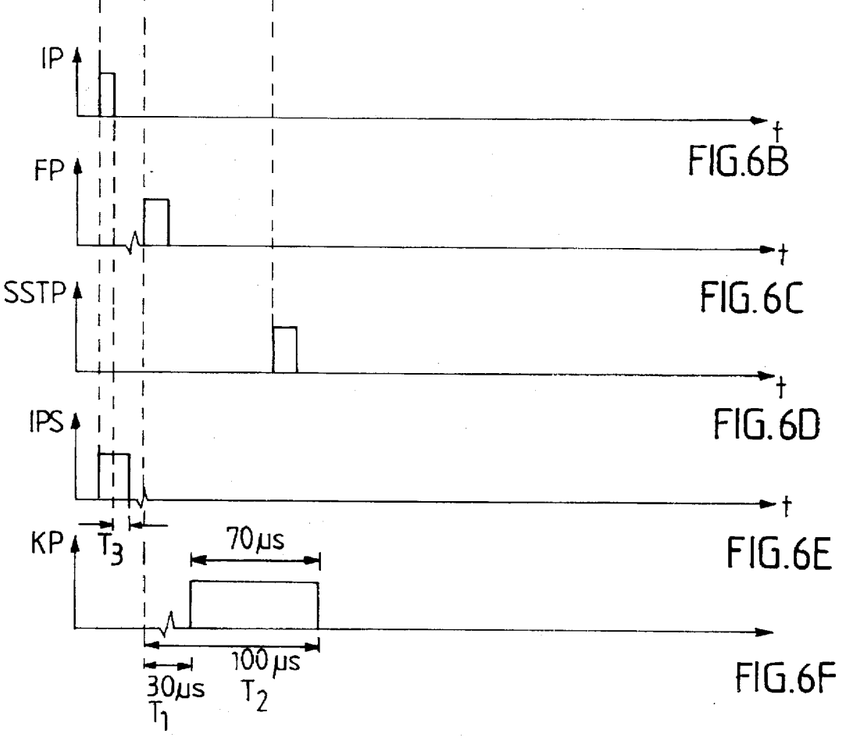
Figure 7A:
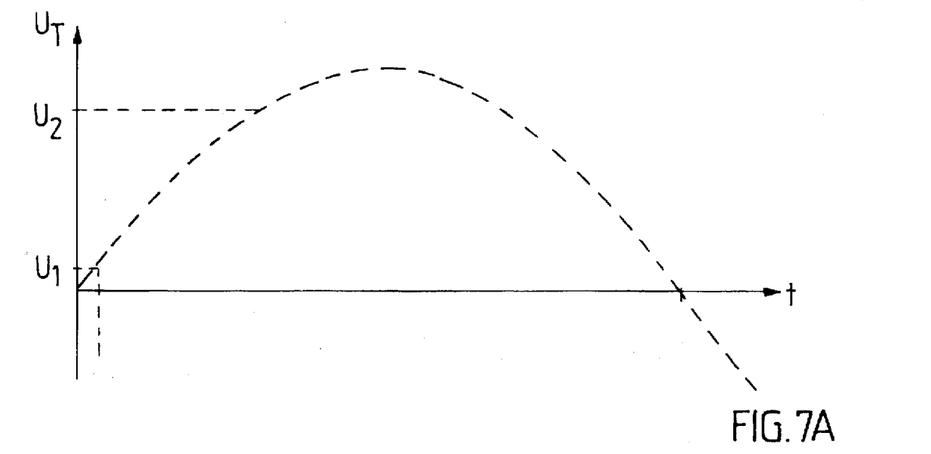
FIGS. 7A–7F show an example of signals and time sequences in the system according to FIG. 2 when a control unit neither omits a first indication signal nor reports voltage-controlled trigging.
Figure 7B:
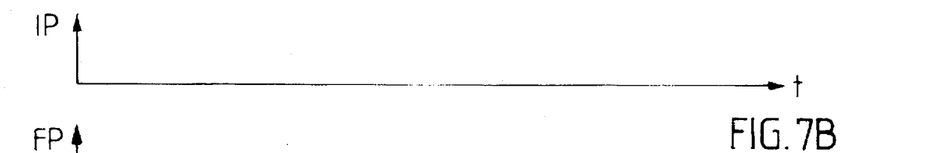
Figures 7C, 7D:
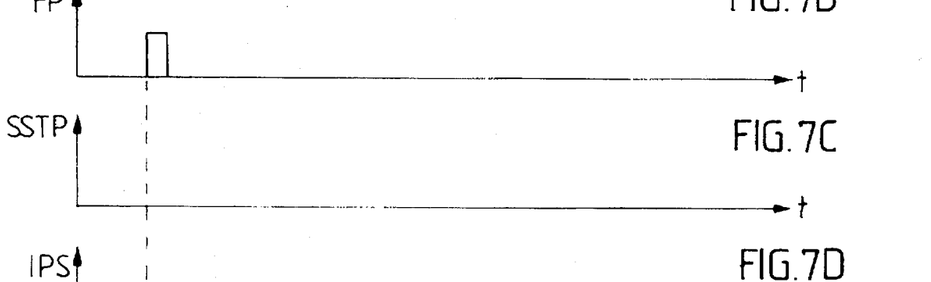
Figures 7E, 7F:
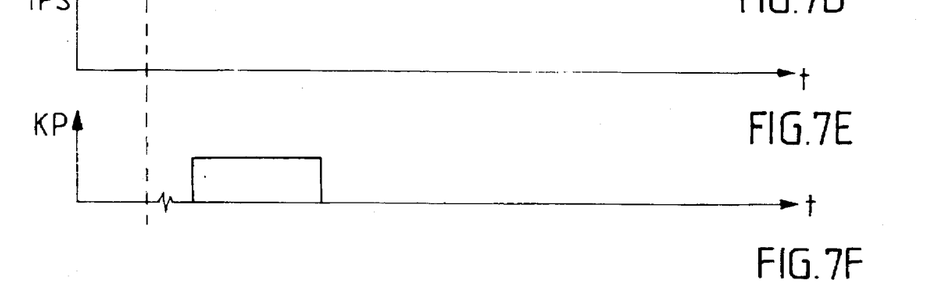

FIGS. 5, 6 and 7 illustrate in a principal manner how the voltage $U_T$ across the thyristor THY1 can appear and exemplify how the above described system operates.

FIG. 5 shows a normally operating trigging sequence. Positive voltage in the drawings signifies positive forward voltage across the thyristor THY. The forward voltage level $U_1$ indicates the voltage at which an indication pulse shall be generated by the control unit TCU and the voltage level U2 indicates the voltage level at which the control unit TCU shall initiate voltage-controlled trigging and an SSTP signal. The voltage level $U_2$ can, for example, be in the order of 7000 V.

FIG. 5B illustrates an indication pulse which is generated when the voltage $U_T$ exceeds the threshold value $U_1$. The indication pulse is delivered from the output 111 of the control unit TCU1 to the central control assembly 10 which, in dependence thereof, delivers a common trigging order pulse CP so that trigging order signals FB1–FBN are delivered to all control units TCU1–TCVN.

FIG. 5C illustrates the trigging pulse FP which is received on the input 106 of the control unit TCV. As is illustrated by the dashed line which extends from the positive edge of the trigging pulse FP in FIG. 5C, the voltage $U_T$ decreases across the thyristor to 0 or approximately 0 as a result of the trigging of the thyristor. The forward voltage level across the thyristor thereafter remains at a slightly positive level just above 0 V as long as current flows through the thyristor. When the voltage across the rectifier unit eventually changes sign and/or when the current in the conducting direction of the thyristor ceases, the thyristor will be rearward biased as illustrated by a zero crossing 252 in FIG. 5A.

FIG. 5D illustrates that no second indication signal SSTP arises when the control unit is functioning normally.

FIG. 5E illustrates the signal IPS which is generated in the time circuit 170.

FIG. 5F illustrates the signal KP which controls the operation of the processor unit 220 with readings of the memory units 150.

FIG. 6 illustrates the case when the thyristor does not trigg as a result of the trigging signal FP, but instead trigs due to voltage-controlled protection trigging. The control unit TCU thus generates an indication pulse IP and the control unit 10 generates a trigger signal FP as described above, though the voltage $U_T$ continues to increase because the thyristor has not trigged. When the positive forward voltage $U_T$ across the thyristor exceeds the threshold value $U_2$, the control unit initiates voltage-controlled trigging and a signal SSTP is generated to indicate that voltage-controlled trigging has taken place. The signal SSTP is illustrated in FIG. 6D.

FIG. 7 illustrates the case in which the thyristor at the control unit TCU in question is short-circuited. Since neither the threshold value $U_1$ nor the threshold value $U_2$ is attained across the thyristor in question, neither will signals IP or SSTP be generated. However, the control unit TCU nevertheless receives a trigger signal FP since one or more of the remaining thyristors in the rectifier unit receive voltage and inform the control assembly 10 to generate the trigging signal FP.

As will be apparent from the above description of the control unit TCU and the evaluation unit 30, the system according to the described embodiment is arranged to transmit the signals IP and SSTP on the same transmission line.

When comparing FIG. 5B with FIG. 6D, it will be apparent that the signals IP and SSTP can nevertheless be differentiated from each other since they arise at different instances in time.

With reference to FIG. 4 and FIGS. 5–7, the evaluation unit 30 operates in the following manner.

At the starting point, all RS flip-flops 150 are set to 0. When the voltage $U_T$ exceeds the threshold value $U_1$, an indication signal IP is delivered from the control units CTU operating for this purpose.

The signal IP sets corresponding RS flip-flop 150. The signals IP-IPN are also delivered to respective inputs of the OR-gate 160.

Each indication signal IP has, in accordance with this embodiment, substantially one µs duration and since the individual IP signals arise with certain distribution, the output signal from the OR-gate will be a shower of pulses with the shower lasting for up to 300 µs.

It lies within the scope of the invention that the indication pulses have a different duration such as somewhere within the interval 0, 5 µs to 10 µs.

The output signal of the OR-gate 160 is delivered to the time circuit 170, the purpose of which being to generate a steady signal IPS depending on the inputted signal shower, which steady signal indicates that an indication pulse IP has arrived. The signal IPS becomes high on the positive edge of the first indication signal IP and, according to the preferred embodiment, maintains the high signal level on the IPS for 192 µs after the negative edge of the output signal of the OR-gate. The signal IPS is thus high for a time interval $T_3$=192 µs after the negative edge of the latest indication pulse IP. Some examples of this are illustrated in FIGS. 5E and 6E, respectively. This implies, as a result of the inverted input 180 of the OR-gate 182, that the AND-gate 180 is locked at a low output signal as long as IPG is high. With retriggings during a lead interval, the trigging order signal CP is generated immediately in response to an indication signal IP and during these retriggings the evaluation readings of the RS flip-flops 150 are not to be carried out. The signal IPS under such circumstances will become high as a result of said retrigging generating indication signals, and the signal IPS remains high during the time T3 in order to lock the output signal KP of the AND-gate 190 at a lower level. In this manner the goal of performing the evaluation procedure only at the first trigging order in each lead interval for the valve units is attained.

The control means 20 (FIG. 2) can, for example, be connected to the output of the OR-gate 160 via the bus 244 to detect that some IP has been received and the control means 20 depending thereon, delivers a trigger order signal CP. The first, and normally the only, trigging order signal CP during a lead interval is generated by the control assembly 20 with a certain delay once a first indication signal IP has been received. A number of other stipulations must first be met, and in practice the first trigging order signal CP is generated later than the time T3 after which an indication signal IP has been received. As mentioned above, it does however occur sometimes that a thyristor may extinguish during the lead interval, commences to receive voltage and generates a first indication signal IP. In such cases, the control assembly 10 shall immediately generate the trigging order signal, but not perform the evaluation routine. The trigging order signal is received both on the input 106 of each control unit TCU (FIG. 3), as well as on the input 40 of the central evaluation unit 30 (FIG. 4).

The trigging order pulse CP is received on the input 40 and fed to the signal time means 250, where the means 250 has the function of a monostable flip-flop which becomes high during the time $T_2=100$ μs after receiving a positive edge of the signal CP. As is illustrated in FIG. 5F, the means 196 generates a signal which becomes high after the delay $T_1=30$ μs after the positive edge of the output signal of the monostable flip-flop 250.

The time circuit 196 thus gives a delay of $T_1=30$ μs before a high signal is delivered to the inputs 210 and 200 of the processor unit. This implies that possible incorrectly sent indication signals which can have been generated by the control units TCV in connection with the transients which arise at the trigging instance are not incorrectly interpreted as second indication signals SSTP.

The above stated times $T_1$, $T_2$ and $T_3$ are only examples according to a preferred embodiment of the invention. The time $T_1$ can alternatively be chosen within the interval 0–70 μs. A plurality of combinations of the time intervals $T_1$, $T_2$, $T_3$ are possible and these time intervals determine the size of a time window within which the processor unit 220 performs readings of the RS flip-flops 150.

The AND-gate 190 thus generates in cooperation with the time circuit 196 during normal operation a control pulse KP, the positive edge of which arises at the time $T1=30$ μs after the positive edge of the trigging signal CP if the signals IPS is not high at that instance.

A positive edge of the control pulse KP which is detected at the input 210 of the processor 220 initiates a first interruption routine (interrupt) to be performed by the processor. The processor 220 thus reads all the RS flip-flops 150 and stores the result in a first memory vector M1 with N positions (see FIG. 8). A road high signal implies that the corresponding control unit TCU has sent a normal first indication pulse, whilst a read low signal implies that the corresponding control unit TCU has not sent an indication pulse. After reading the Q-outputs of the flip-flops 150, the processor 220 sends a reset signal to the output 240 so that the RS flip-flops 150 are set to zero in order to be in a ready state to receive the second indication signal SSTP.

The negative edge of the signal KP arises at the time T2 after the positive edge of the trigging order signal CP.

At the negative edge of the signal KP a second interruption routine is activated in the processor 220 as a result of detection at the input 200. In the second interruption routine, the RS flip-flops 150 are once again read via the databus which is connected to the input 230. A read high signal at this instance implies that the corresponding control unit TCU has generated a signal SSTP indicating voltage-controlled trigging. The read signal bits are stored in a second memory vector M2 with N positions, i.e. as many positions as the number of RS flip-flops 150. In this manner, an individual condition code is generated for each valve unit.

Figure 8:
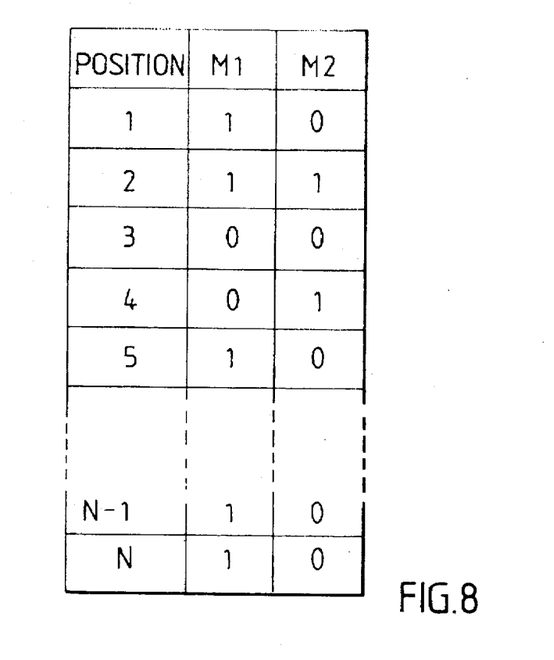
FIG. 8 is a table which illustrates two memory vectors M1 and M2 respectively for storing the first indication signals (IP) and the second indication signals (SSTP) respectively.

With reference to the table in FIG. 8, for each position one of the following four combinations can have arisen:

(M1, M2)=(1,0)
(M1, M2)=(1,1)
(M1, M2)=(0,0)
(M1, M2)=(0,1)

In FIG. 8, position 1 illustrates the signal sequence which is shown in FIGS. 5A–5F, i.e. normal operation of the valve unit which comprises the control unit TCU1 and the thyristor THY1.

Position 2 in FIG. 8 illustrates the signal combination (1,1) which arises when voltage-controlled trigging is indicated. The corresponding signal sequence is illustrated in FIGS. 6A–6F.

Position 3 in FIG. 8 illustrates the signal combination (0,0) which arises when the thyristor is short-circuited. The corresponding signal sequence is illustrated in FIGS. 7A–7F.

Position 4 in FIG. 8 illustrates the signal combination (0,1) which arises if the corresponding control unit has not sent a first indication pulse, but instead sent an indication of voltage-controlled trigging. This combination thus indicates that a fault is present in the control unit TCU4 in the fourth position and that the fault is in the criteria unit 90 or one of the components up to the electro-optical means 110.

In order to filter out interference signals which can randomly arise, a number of time-consecutive measured results are stored and only if the same fault condition is detected at more than a predetermined quota of control instances for a certain valve position is an alarm signal generated. An alarm signal comprises the following information:

Alarm condition: one of the above described signal combinations (1,1), (0,0) or (0,1).

Valve position: whichever of the valve positions 1–N in question.

Time instance: the data and the moment in time that the alarm was generated.

A convertor arrangement for an HVDC system according to the invention thus comprises a system for continuous supervision of the functioning of distributed system components. The system according to the invention performs the supervision by means of repeated application of a distributed first method F1 and a similarly repeated application of a central second method F2. The main aspects of the methods F1 and F2 are illustrated in FIG. 9A and 9B.

Figure 9A:
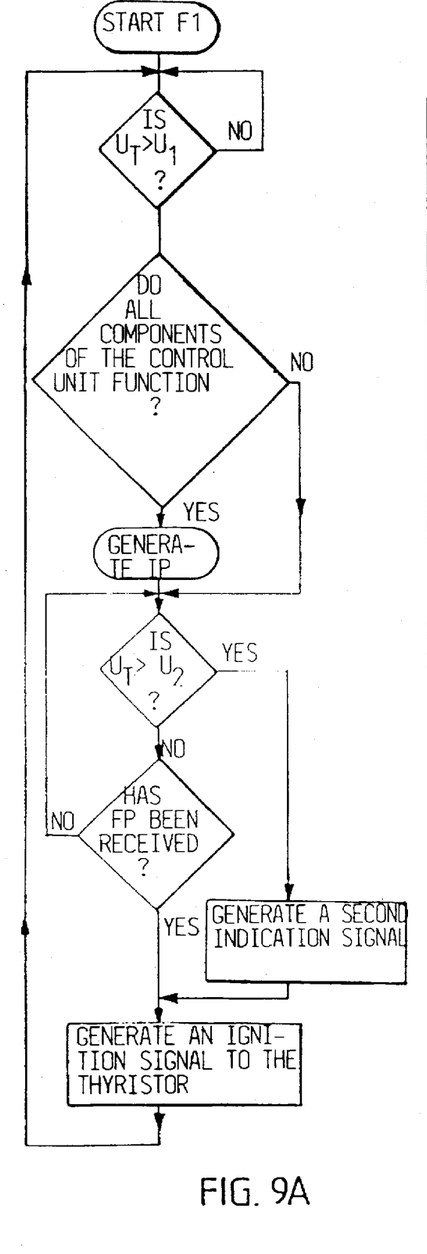
FIG. 9A illustrates a method which is performed in a control unit TCU in the system according to FIG. 2.

The first method F1, which is illustrated in FIG. 9A is carried out by each control unit TCU each time the corresponding thyristor THY receives a positive forward voltage which exceeds the threshold value $U_1$. When the forward voltage $U_T$ exceeds the threshold value U, in accordance with the method a correctly functioning control unit will generate a first indication signal IP. That or those control units which suffer from a fault in corresponding components will not generate a first indication signal.

Since the system comprises a large number of control units, one or more of the control units will, however, generate an indication signal. The central second method F2 in the central unit 10 commences once a number of triggering stipulations have been met. One of these stipulations is that an indication signal IP has been received.

Figure 9B:
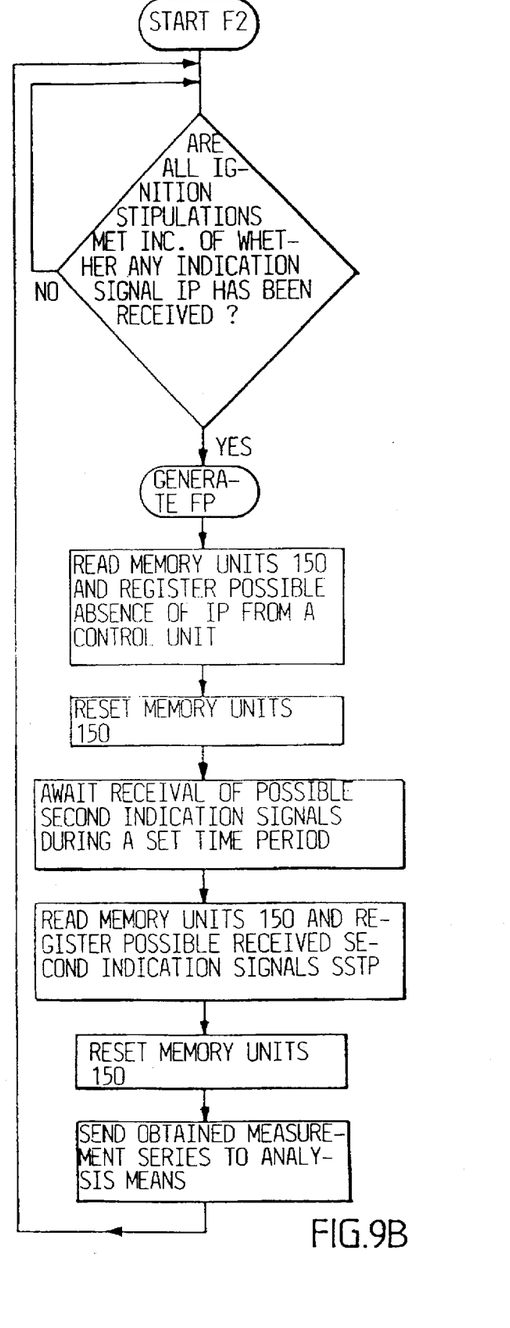
FIG. 9B illustrates a method which is performed in a central control assembly in the system according to FIG. 2.

According to the method F2, see FIG. 9B, a trigger order signal CP, FP is generated for delivery to both the central evaluation unit 30 and to each distributed control unit TCU.

According to the method F2, the memory units 150 (see FIG. 4) which have registered each received first indication signal IP from the control units are now read. The memory units 150 are thereafter set to zero in order to be prepared to register a possible second indication signal SSTP from one or more of the control units. A waiting period commences after the zero-setting operation. A signal which is registered during the waiting period in any one of the memory units 150 will be interpreted as a second indication signal SSTP.

In each control unit, the method F1 (see FIG. 9A) implies a wait to obtain a trigger order signal from the central control assembly 10. When waiting for the triggering order, a test is continuously executed to determine whether the forward voltage $U_T$ across the thyristor exceeds the second threshold value $U_2$.

If the forward voltage $U_T$ exceeds the second threshold value $U_2$ before a trigger order signal is detected, a second indication signal SSTP is generated at the same time that a locally initiated voltage-controlled trigging of the thyristor is initiated.

If a trigger order signal FP is detected, a trigger signal to the thyristor is always generated.

Once this trigging signal has been generated, the method F1 implies a repetition from the starting position by waiting until the voltage $U_T$ exceeds the voltage threshold value $U_1$, as described above.

According to the method F2, the memory units 150 are read after the waiting period and the received measurement series is delivered to an analysis means for analysis according to the above description. Thereafter, the method F2 is repeated from its start position by waiting for a first indication signal.

We claim:

1. Method for supervising the functioning of a plurality of valve units, wherein each valve unit comprises a semiconductor element (THY1-THYN) and a control unit for controlling the semiconductor element, in which the control unit comprises a trigger order input for receiving a trigger order signal (FP), an indication output for emitting a first indication signal (IP), and a trigger signal output (100) for emitting a trigger signal to the semiconductor element, wherein the method comprises the steps:

detecting a positive forward voltage ($U_T$) across the semiconductor valve, generating a first indication signal (IP) when the forward voltage ($U_T$) exceeds a first threshold value ($U_1$), generating a trigger signal upon detected receival of the trigging order signal (FP), and generating a second indication signal (SSTP) when the forward voltage ($U_T$) exceeds a second threshold value ($U_2$), said second threshold value being higher than said first threshold value.

2. Method according to claim 1 modified by omitting the step of generating a first indication signal (IP) when the forward voltage ($U_T$) exceeds a first threshold value ($U_1$), the omission indicating a component malfunction.

3. Method according to claim 1, further comprising the step of:

generating the trigging order signal (CP, FP) in response to a received first indication signal.

4. Method according to claim 1, further comprising the step of: generating a condition code, which condition code indicates the operational condition of the valve unit (TCU, THY).

5. Method according to claim 4, further comprising the step of: evaluating the condition code such that a fault in the control unit is indicated.

6. Method according to claim 1, further comprising the steps of:

generating a first alarm signal if the condition code indicates the lack of the first indication signal, and generating a second alarm signal if the condition code indicates that a second indication signal has been registered.

7. Method according to claim 4, further comprising the steps of:

saving a number of time-consecutive condition codes;

generating an alarm signal only if the same condition code is detected at more than a predetermined quota of the saved condition codes.

8. Method according to any one of the preceeding claims, further comprising the steps of:

storing of received first indication signals (IP) in respective memory units (150), activating an evaluation routine depending on the trigging order signal, registering the lack of any first indication signal (IP), and resetting the memory units (150), storing received second indication signals (SSTP) in the memory units (150), registering receival of a second indication signal (SSTP) and resetting the memory units (150).

9. Method according to claim 1, further comprising the step of:

transferring the first indication signal and the second indication signal on the same transmission line.

10. System for supervising the functioning of a plurality of components in a converter system, in which the system comprises a central control assembly (10) and a plurality of valve units, in which each valve unit has:

a) an identity (1–N), b) a semiconductor element (THY1-N), c) a control unit for controlling the semiconductor element, d) a trigger order input for receiving a trigger order signal (FP), e) an indication output for emitting a first indication signal (IP) for announcing that the semiconductor element in its forward voltage direction has achieved a first predetermined voltage threshold value, said first predetermined voltage threshold value corresponding to a sufficient forward voltage for ensuring effective trigging of the semiconductor element, and f) a trigger signal output for emitting a trigger signal to the semiconductor element, and wherein g) the control unit comprises means (60, 120, 105, 110) for emitting a second indication signal (SSTP) when the semiconductor element in its forward voltage direction has attained a second predetermined voltage threshold value.

11. System according to claim 10, wherein the central control assembly (10) comprises an evaluation means (30) which is arranged to register the second indication signal (SSTP) and corresponding valve unit identity.

12. System according to claim 11, wherein the evaluation means is arranged to register the identity of each valve unit from which a first indication signal has been found to be lacking.

13. Control unit for activating a semiconductor element (THY) in an HVDC-plant whereby the control unit comprises a trigger order input for receiving a trigger order signal (FP), and an indication output (111) for emitting a first indication signal (IP) for indicating that the semiconductor element in its forward voltage direction has attained a first predetermined voltage threshold value, said first predetermined voltage threshold value corresponding to a sufficient forward voltage for ensuring effective trigging of the semiconductor element, and a trigger signal output (100) for emitting a trigger signal to the semiconductor element, and a criteria unit which, in response to the semiconductor element in its forward voltage direction attaining a second predetermined voltage threshold value ($U_2$), is arranged to generate an activation signal which, in turn, activates the trigging signal, whereby the control unit is set up to emit a second indication signal (SSTP) in response to the activation signal.

14. Control unit according to claim 13, wherein the control unit is set up to emit the second indication signal (SSTP) in response to the simultaneous occurrence of the activation signal and the trigging signal, the control unit emitting the first and the second indication signals on the same indication output.

15. Control unit according to claim 13, wherein the trigging order input is a light pulse input and the indication output comprises an electro-optical means (110) for emitting light pulses.

16. Control unit according to claim 13, wherein the output of the criteria unit is connected to a first input of an AND-gate (120), and a second input of the AND-gate (120) is connected to the trigging signal output (100), and in that the output of the AND-gate (120) is connected functionally to the electro-optical means (110).

17. Control assembly for cooperation with a plurality of control units according to claim 13, the control assembly (10) comprising:

a plurality of signal inputs (150, 42) for receiving the first and the second indication signals (IP, SSTP), a control means for generating a trigger order signal (FP) in response to detection of at least one first indication signal, an evaluation means (30) which, in response to the trigging order signal (FP), operates to read the signal inputs (150) and register the presence and/or the absence of the indication signals (IP, SSTP).

18. Control assembly according to claim 17, wherein each signal input (I1-IN) comprises a memory unit (150) being settable to a first value in response to reception of a first indication signal, the evaluation means (30) being arranged to reset the memory unit to a second value after receiving the trigging order signal (FP);

the evaluation means (30) being arranged to await reception of a possible second indication signal, the memory unit (150) being settable to the first value in response to reception of a second indication signal, the evaluation means operating to read and register the value of the memory unit (150).

19. Control assembly according to claim 18, wherein the evaluation means is arranged to perform the following consecutive steps upon receival of the trigging order signal (FP);

a) wait until a first time period (T1) has elapsed and thereafter b) read the respective values (IP) of each memory unit (150);

c) reset the memory units (150);

d) receive possible arrived second indication signals (SSTP); and e) wait until a second time period (T2) has elapsed and thereafter f) read the respective values (SSTP) of each memory unit (150).

* * * * *